United States Patent
Sasai et al.

(10) Patent No.: US 12,337,505 B2
(45) Date of Patent: Jun. 24, 2025

(54) METHOD FOR PRODUCING FIBER-REINFORCED COMPOSITE MATERIAL

(71) Applicants: SHIBAURA MACHINE CO., LTD., Tokyo (JP); National University Corporation Kanazawa University, Ishikawa (JP)

(72) Inventors: Yuya Sasai, Shizuoka (JP); Yoshio Iizuka, Shizuoka (JP); Kaho Osada, Shizuoka (JP); Kentaro Taki, Ishikawa (JP)

(73) Assignees: SHIBAURA MACHINE CO., LTD., Tokyo (JP); National University Corporation Kanazawa University, Ishikawa (JP)

( * ) Notice: Subject to any disclaimer, the term of this patent is extended or adjusted under 35 U.S.C. 154(b) by 0 days.

(21) Appl. No.: 18/275,408

(22) PCT Filed: Aug. 3, 2022

(86) PCT No.: PCT/JP2022/029732
§ 371 (c)(1),
(2) Date: Aug. 2, 2023

(87) PCT Pub. No.: WO2023/032569
PCT Pub. Date: Mar. 9, 2023

(65) Prior Publication Data
US 2024/0033974 A1    Feb. 1, 2024

(30) Foreign Application Priority Data
Aug. 31, 2021   (JP) ................................. 2021-140931

(51) Int. Cl.
*B29B 7/90*    (2006.01)
*B29B 7/42*    (2006.01)
(Continued)

(52) U.S. Cl.
CPC ................. *B29B 7/90* (2013.01); *B29B 7/42* (2013.01); *B29C 70/06* (2013.01); *B29K 2105/12* (2013.01); *B29K 2309/08* (2013.01)

(58) Field of Classification Search
CPC .......... B29B 7/42; B29B 7/426; B29B 7/487; B29B 7/823; B29B 7/826; B29C 70/06;
(Continued)

(56) References Cited

U.S. PATENT DOCUMENTS

2016/0332331 A1   11/2016   Kobayashi et al.
2017/0050366 A1   2/2017    Kobayashi et al.
(Continued)

FOREIGN PATENT DOCUMENTS

JP   3464242       11/2003
JP   2020189916    * 11/2020
(Continued)

OTHER PUBLICATIONS

"Office Action of Taiwan Counterpart Application", issued on Nov. 3, 2023, with English translation thereof, p. 1-p. 11.
(Continued)

*Primary Examiner* — Camie S Thompson
(74) *Attorney, Agent, or Firm* — JCIPRNET

(57) ABSTRACT

This method for producing a fiber-reinforced composite material includes: a fiber dispersion process of providing a fiber-dispersed resin by kneading a resin 10a with fibers 10b to disperse the fibers 10b in the resin 10a; and a molecular weight reduction process in which, while transporting the fiber-dispersed resin along an outer peripheral surface of a screw body 37 provided with a passage 88 inside, the fiber-dispersed resin passes from an inlet 91 of the passage 88 to an outlet 92 of the passage 88 and a shear force is applied to the fiber-dispersed resin by restricting the transport of the fiber-dispersed resin with a barrier unit 82
(Continued)

disposed between the inlet 91 and the outlet 92 of the passage 88 on the outer peripheral surface.

7 Claims, 10 Drawing Sheets

(51) Int. Cl.
*B29C 70/06* (2006.01)
*B29K 105/12* (2006.01)
*B29K 309/08* (2006.01)

(58) Field of Classification Search
CPC ......... B29K 2023/0683; C08F 2500/01; C08F 2500/19; C08L 23/06; C08L 2205/025; C08L 2207/068
See application file for complete search history.

(56) References Cited

U.S. PATENT DOCUMENTS

| | | |
|---|---|---|
| 2018/0333896 A1 | 11/2018 | Tapsak et al. |
| 2022/0305704 A1 | 9/2022 | Sameshima et al. |
| 2022/0325455 A1 | 10/2022 | Sasai et al. |

FOREIGN PATENT DOCUMENTS

| | | |
|---|---|---|
| TW | 201510022 | 3/2015 |
| TW | 202128848 | 8/2021 |
| WO | 2015163197 | 10/2015 |
| WO | 2015170616 | 11/2015 |
| WO | 2020235533 | 11/2020 |
| WO | 2021132175 | 7/2021 |

OTHER PUBLICATIONS

"Office Action of Korea Counterpart Application", issued on Nov. 1, 2023, with English translation thereof, p. 1-p. 10.

"International Search Report (Form PCT/ISA/210) of PCT/JP2022/029732", mailed on Sep. 13, 2022, with English translation thereof, pp. 1-4.

"International Preliminary Report on Patentability (Form PCT/IPEA/409) of PCT/JP2022/029732", mailed on Feb. 28, 2023, with English translation thereof, pp. 1-19.

"Office Action of Taiwan Counterpart Application", issued on Apr. 7, 2023, with English translation thereof, pp. 1-15.

"Office Action of Japan Counterpart Application", issued on May 30, 2023, with English translation thereof, pp. 1-11.

"Office Action of China Counterpart Application", issued on May 8, 2024, with English translation thereof, p. 1-p. 21.

"Office Action of Korea Counterpart Application", issued on May 30, 2024, with English translation thereof, p. 1-p. 9.

"Office Action of China Counterpart Application", issued on Sep. 12, 2024, with English translation thereof, p. 1- p. 12.

"Decision of Refusal of China Counterpart Application", issued on Jan. 1, 2025, with English translation thereof, p. 1-p. 17.

\* cited by examiner

METHOD FOR PRODUCING FIBER-REINFORCED COMPOSITE MATERIAL

CROSS-REFERENCE TO RELATED APPLICATION

This application is a 371 application of the International PCT application serial no. PCT/JP2022/029732, filed on Aug. 3, 2022, which claims the priority benefits of Japan Patent Application No. 2021-140931, filed on Aug. 31, 2021. The entirety of each of the above-mentioned patent applications is hereby incorporated by reference herein and made a part of this specification.

TECHNICAL FIELD

The present invention relates to a method for producing a fiber-reinforced composite material suitable for use as a material for a thin molded product, such as a speaker diaphragm, which is produced by injection molding.

RELATED ART

A fiber-reinforced composite resin (material) added with reinforcing fibers to improve mechanical properties is produced by dispersing reinforcing fibers in a resin. In order to obtain a well-dispersed fiber-reinforced composite material that prevents the resin from having unopened fibers and agglomerated fibers due to insufficient kneading, it is necessary to increase the viscosity during kneading to some extent using a twin-screw kneading extruder. Furthermore, since the addition of reinforcing fibers to the resin increases the viscosity, conventionally it is difficult to produce a low-viscosity fiber-reinforced composite material.

On the other hand, when molding a thin or complex shape by injection molding, it is necessary to use a low-viscosity material with high fluidity in order to flow the material into a narrow part of the mold that has many irregularities under a high pressure. However, as mentioned above, it is difficult to produce a low-viscosity fiber-reinforced composite material suitable for injection molding.

Patent Literature 1 describes a method for producing a polyamide resin composition, which blends inorganic fillers by side feeding while melting and kneading the resin to reduce the melt viscosity of the polyamide resin in order to stably produce a reinforced polyamide resin composition with excellent strength, rigidity, molding fluidity, and surface appearance.

CITATION LIST

Patent Literature

[Patent Literature 1] Japanese Patent No. 3464242

SUMMARY OF INVENTION

Technical Problem

However, with the production method of Patent Literature 1, it is difficult to produce a low-viscosity fiber-reinforced composite material with high fluidity that can easily flow into an injection molding mold with a narrow part.

The present invention aims to provide a method for producing a low-viscosity fiber-reinforced composite material with high fluidity. The present invention also aims to achieve low viscosity of the fiber-reinforced composite material while maintaining the mechanical properties of the molded product improved by fibers.

Solution to Problem

A method for producing a fiber-reinforced composite material according to the present invention includes a fiber dispersion process of forming a fiber-dispersed resin by kneading a resin with fibers to disperse the fibers in the resin; and a molecular weight reduction process of reducing a molecular weight of the fiber-dispersed resin. The molecular weight reduction process, while transporting the fiber-dispersed resin along an outer peripheral surface of a screw body that includes a passage inside, restricts transport of the fiber-dispersed resin with a barrier unit provided between an inlet and an outlet of the passage on the outer peripheral surface to form a resin reservoir, in which a filling rate of the fiber-dispersed resin is 100%, immediately before the barrier unit, apply a shear force to the fiber-dispersed resin with a rotation speed of the screw body set to 1000 rpm or more and 3600 rpm or less, and cause the fiber-dispersed resin to pass from the inlet of the passage to the outlet of the passage.

Effects of Invention

By performing the molecular weight reduction process to reduce the molecular weight of the fiber-dispersed resin, in which the fibers are dispersed, after the fiber dispersion process of dispersing fibers in the resin, it is possible to reduce the viscosity of the fiber-reinforced composite material. Thus, it is possible to produce a low-viscosity fiber-reinforced composite material with high fluidity, which is suitable as a material for injection molding.

Furthermore, by quickly reducing the viscosity of the fiber-dispersed resin through molecular weight reduction in the molecular weight reduction process after dispersing the fibers through the fiber dispersion process, it is possible to suppress fiber breakage and maintain the fiber length. Accordingly, it is possible to reduce the viscosity of the fiber-reinforced composite material while maintaining the mechanical properties of the molded product of the fiber-reinforced composite material.

DESCRIPTION OF EMBODIMENTS

Figure 1:
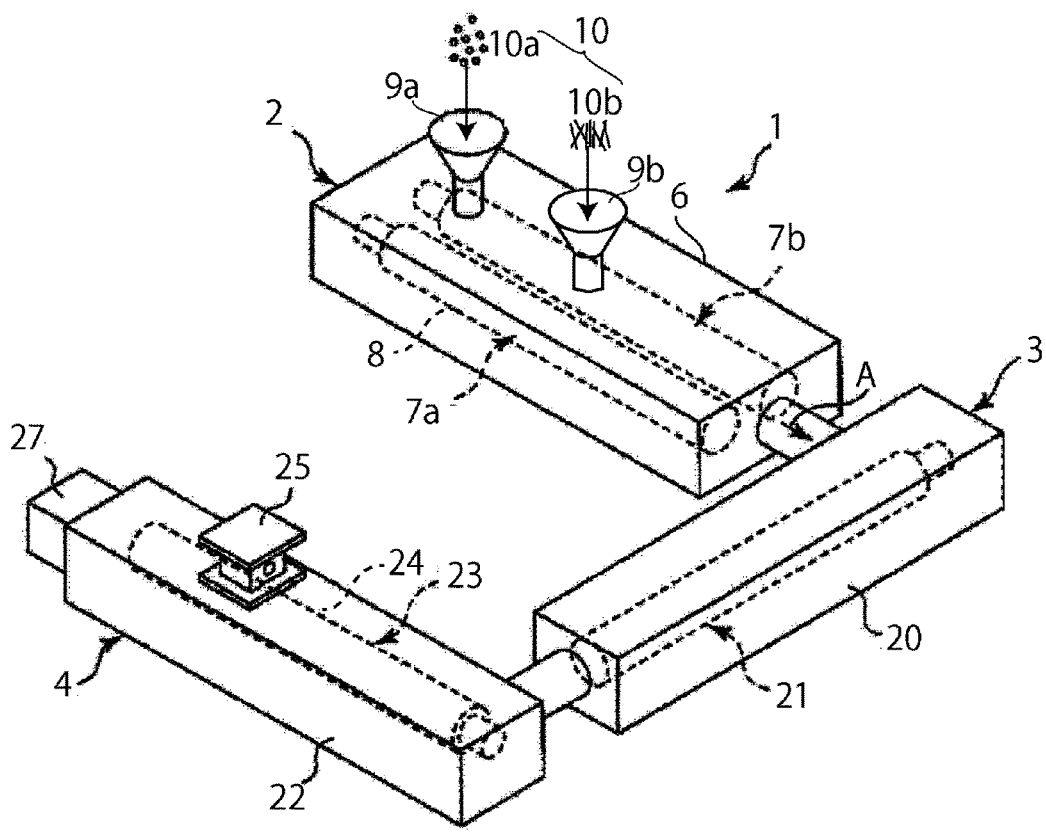
FIG. 1 is a perspective view schematically showing the continuous high shear processing device used in the production method of the present invention.

Hereinafter, an embodiment of the present invention will be described with reference to the drawings as appropriate.

A method for producing a fiber-reinforced composite material according to the present embodiment includes a fiber dispersion process and a molecular weight reduction process.

(Fiber Dispersion Process)

The fiber dispersion process is a process of kneading a resin with fibers to disperse the fibers in the resin, and is performed using a continuous high shear processing device (hereinafter, also referred to as a high shear processing device as appropriate) such as a twin-screw kneading extrusion unit and a twin-screw kneading extruder. The twin-screw kneading extruder includes, for example, the twin-screw kneading extruder TEM series (manufactured by Shibaura Machine Co., Ltd.).

The resin included in the raw material includes, for example, thermoplastic resins such as polypropylene (PP), polysulfone (PS), polyethylene terephthalate (PET), polybutylene terephthalate (PBT), polyether sulfone (PES), polyphenylene sulfide (PPS), polyether ketone (PEK), polyether ether ketone (PEEK), aromatic polyamide (PA), aromatic polyester, aromatic polycarbonate (PC), polyether imide (PEI), polyarylene oxide, thermoplastic polyimide, and polyamide imide. These resins may be used alone or in combination of two or more.

The fibers included in the raw material include, for example, glass fibers (GF), carbon fibers (CF, unused and recycled), aramid fibers (Kevlar fibers), and boron fibers. These fibers may be used alone or in combination of two or more.

The fiber-reinforced composite material may contain components other than the aforementioned resins and reinforcing fibers. The components that may be contained include, for example, additives such as antioxidants (sulfur-based, phosphorus-based), carboxylic acid anhydrides, maleic acids, plasticizers, UV absorbers, flame retardants, and crystal nucleating agents, and various fillers (carbon black, talc, metal powder, CNT, silica particles, mica). The blending amount is set to a range that makes it possible to maintain the strength and elasticity according to the application of the fiber-reinforced composite material.

The weight ratio between the resin and the fibers used in the fiber dispersion process may be appropriately set according to the mechanical properties required for the fiber-reinforced composite material to be produced. From the viewpoint of uniformly dispersing the fibers in the resin in the fiber-reinforced composite material and improving the workability when drawing strands in pellet production, the weight ratio (fiber/resin) is preferably 7/3 or less, more preferably 6/4 or less, and even more preferably 5/5 or less. Moreover, from the viewpoint of increasing the mechanical strength of the fiber-reinforced composite material, the weight ratio (fiber/resin) is preferably 1/9 or more, more preferably 2/8 or more, and even more preferably 3/7 or more.

When performing the fiber dispersion process using a twin-screw kneading extruder, the conditions such as rotation speed and temperature thereof may be appropriately set according to the types, weight ratio, etc. of the resin and fibers so as to uniformly disperse the fibers in the resin. For example, when using polypropylene (PP) as the resin and glass fibers (GF) as the fibers, and setting the weight ratio (GF/PP) to 2/8 to 6/4, it is possible to form a fiber-dispersed resin in which GF is uniformly dispersed in PP using a twin-screw kneading extruder with an extrusion amount of 10 to 50 kg/h, a rotation speed of 100 to 500 rpm, a barrel temperature of 150 to 250° C., and a processing time of about 60 to 180 seconds.

(Molecular Weight Reduction Process)

The molecular weight reduction process is a process of reducing the molecular weight of the fiber-dispersed resin with dispersed fibers to form a low-viscosity and high-fluidity fiber-reinforced composite material, and is performed using a continuous high shear processing device.

There are three factors that cause a decrease in the viscosity of the resin: an increase in temperature, an increase in shear rate, and a decrease in molecular weight. Among these, a decrease in viscosity due to an increase in temperature and an increase in shear rate is reversible, whereas a decrease in viscosity due to a decrease in the molecular weight of the resin is irreversible. Thus, by measuring the viscosity and spiral length of the fiber-reinforced composite material under predetermined conditions, it is possible to indirectly evaluate the degree to which the molecular weight of the fiber-dispersed resin is reduced by the molecular weight reduction process.

The molecular weight reduction process is performed by, when transporting the fiber-dispersed resin along an outer peripheral surface of a screw body which has a passage inside in a high shear processing unit of the continuous high shear processing device, restricting the transport of the fiber-dispersed resin with a barrier unit provided between an inlet and an outlet of the passage on the outer peripheral surface to form a resin reservoir in which the filling rate of the fiber-dispersed resin is 100% immediately before the barrier unit, and applying a shear force to the fiber-dispersed resin, for example, by setting the rotation speed of the screw body to 1000 rpm or more and 3600 rpm or less and causing the fiber-dispersed resin to pass from the inlet of the passage to the outlet of the passage. The configuration of the continuous high shear processing device will be described later with reference to the drawings.

In the case of reducing the molecular weight of the fiber-dispersed resin using a twin-screw kneading extruder, since external heating takes time and there is also a limit to the temperature setting, it is difficult to produce an ultra-low viscosity fiber-reinforced composite material.

In the molecular weight reduction process of the present embodiment, a shear force is applied by the screw body to generate shear heat in the fiber-dispersed resin in the resin reservoir. This shear heat raises the temperature of the fiber-dispersed resin to be higher than the barrel temperature so that it is possible to reduce the molecular weight of the fiber-dispersed resin in a short time. Accordingly, it is possible to produce an ultra-low viscosity fiber-reinforced composite material to be used for injection molding.

In the present invention, reducing the molecular weight of the fiber-dispersed resin refers to reducing the weight-average molecular weight (Mw) of the resin contained in the fiber-dispersed resin. For example, when using polypropylene as the resin, the weight-average molecular weight is reduced from about 250,000 to 1,200,000 after the fiber dispersion process and before the molecular weight reduction process, to about 50,000 to 200,000 by the molecular weight reduction process.

Since the molecular weight of the fiber-dispersed resin decreases before reaching the critical stress for fiber breakage, it is possible to prevent fiber breakage and maintain the fiber length. Accordingly, it is possible to suppress the functionality of the fiber-reinforced composite material from decreasing due to fiber breakage while providing the fiber-reinforced composite material with fluidity suitable for injection molding. Thus, it is possible to produce a fiber-reinforced composite material for injection molding which is suitable for molding a complex shape and a thin object and is able to form a molded product with favorable mechanical properties.

From the viewpoint of obtaining a fiber-reinforced composite material that forms a molded product with excellent strength, the molecular weight reduction process preferably reduces the molecular weight of the fiber-dispersed resin so that the weight-average molecular weight of the resin in the fiber-reinforced composite material after the molecular weight reduction process is 30% or more and 65% or less with respect to 100% of the weight-average molecular weight of the fiber-dispersed resin before the molecular weight reduction process.

By applying a shear force to the fiber-dispersed resin using the high shear processing unit in the continuous high shear processing device described later, the molecular weight reduction process is able to reduce the molecular weight of the fiber-dispersed resin to obtain a fiber-reinforced composite material with fluidity suitable for injection molding without adding additives such as peroxides that promote thermal decomposition reaction. As the molecular weight is reduced by applying a shear force to the fiber-dispersed resin without using additives to promote thermal decomposition reaction, it is possible to produce a homogeneous fiber-reinforced composite material with a small polydispersity (weight-average molecular weight/number-average molecular weight).

The time required for the molecular weight reduction process is preferably short from the viewpoint of suppressing excessive thermal degradation. For example, the time required for the molecular weight reduction process is preferably 30 seconds or less in total, and more preferably 20 seconds or less. If the molecular weight reduction process is repeated, the time for each divided molecular weight reduction process is preferably 15 seconds or less, and more preferably 10 seconds or less. By shortening the time of the molecular weight reduction process, it is possible to suppress thermal degradation of the fiber-dispersed resin, allowing the barrel temperature to be set to a high temperature.

Since the molecular weight can be reduced in a short time, it is preferable to use polypropylene, polysulfone, polyethylene terephthalate, polybutylene terephthalate, polyether sulfone, and polyphenylene sulfide as the resin. By using these resins that achieve low viscosity through molecular weight reduction in a short time, it is possible to suppress fiber breakage during the molecular weight reduction process. Accordingly, it is possible to reduce the viscosity of the fiber-reinforced composite material as well as produce a molded product of the fiber-reinforced composite material with excellent mechanical properties.

(Mechanical Properties of Fiber-Reinforced Composite Material)

According to the production method of the present embodiment, a fiber-reinforced composite material with high fluidity and low viscosity is obtained. For example, it is possible to produce a fiber-reinforced composite material having a spiral length (spiral flow length) of 100 cm or more, 110 cm or more, or even 120 cm or more, and a zero-shear viscosity at 200° C. of 1600 Pa·s or less, 1200 Pa·s or less, or even 500 Pa·s or less. In the present invention, the spiral length and viscosity (zero-shear viscosity) refer to the values measured by the evaluation method described in the example below.

The fiber-reinforced composite material produced by the production method of the present embodiment is suitable as a material for injection molding for low viscosity and excellent fluidity. Moreover, the fibers dispersed in the resin by the fiber dispersion process do not break excessively during the molecular weight reduction process. Thus, the effect achieved by adding fibers to the resin is maintained, and a molded product with excellent mechanical properties is obtained by injection molding. For example, it is possible to produce a molded product with a tensile strength of 30 MPa or more, or even 40 MPa or more, and a bending strength of 40 MPa or more, or even 50 MPa or more. The mechanical properties mentioned here refer to the values evaluated using the evaluation method described in the example below.

(Continuous High Shear Processing Device)

Hereinafter, a continuous high shear processing device 1 used for producing the fiber-reinforced composite material will be described.

As shown in FIG. 1, the continuous high shear processing device 1 includes a twin-screw kneading extrusion unit 2 which is a kneading unit, a high shear processing unit 3 which applies a high shear force to the resin, and a degassing unit 4. These are connected in series in this order.

The twin-screw kneading extrusion unit 2 is used in the fiber dispersion process for melting and kneading a raw material 10 containing a resin 10*a* and fibers 10*b*, and dispersing the fibers in the resin. For example, the resin 10*a* is supplied to the twin-screw kneading extrusion unit 2 as pellets, and the fibers 10*b* are supplied as powder.

Figure 2:
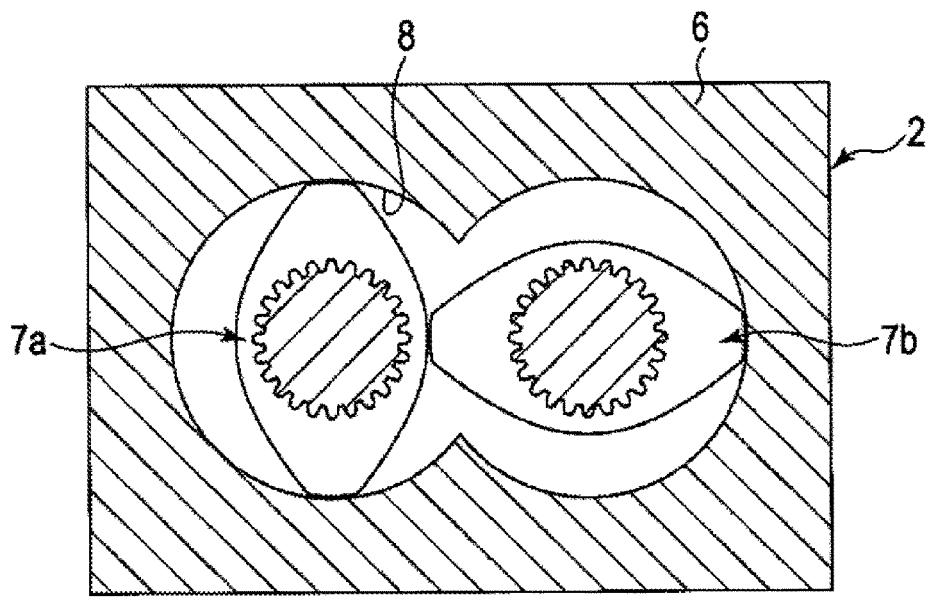
FIG. 2 is a cross-sectional view of the twin-screw kneading extrusion unit.

As shown in FIG. 2, the twin-screw kneading extrusion unit 2 includes a barrel 6 and two screws 7*a* and 7*b* housed inside the barrel 6. The barrel 6 is provided with a cylinder unit 8 having a shape formed by combining two cylinders, and a heater for melting the raw material 10. The resin 10*a* is continuously supplied into the cylinder unit 8 from a supply port 9*a* provided at one end of the barrel 6, and the fibers 10*b* are continuously supplied into the cylinder unit 8 from a supply port 9*b* provided in the middle of the barrel 6.

The screws 7*a* and 7*b* are housed in the cylinder unit 8 in a state of meshing with each other, and are rotated in the same direction by receiving torque transmitted from a motor (not shown). By rotating the screws 7*a* and 7*b* in the same direction, it is possible to strongly knead and melt the resin 10*a* and the fibers 10*b* of the raw material 10.

Figure 3:
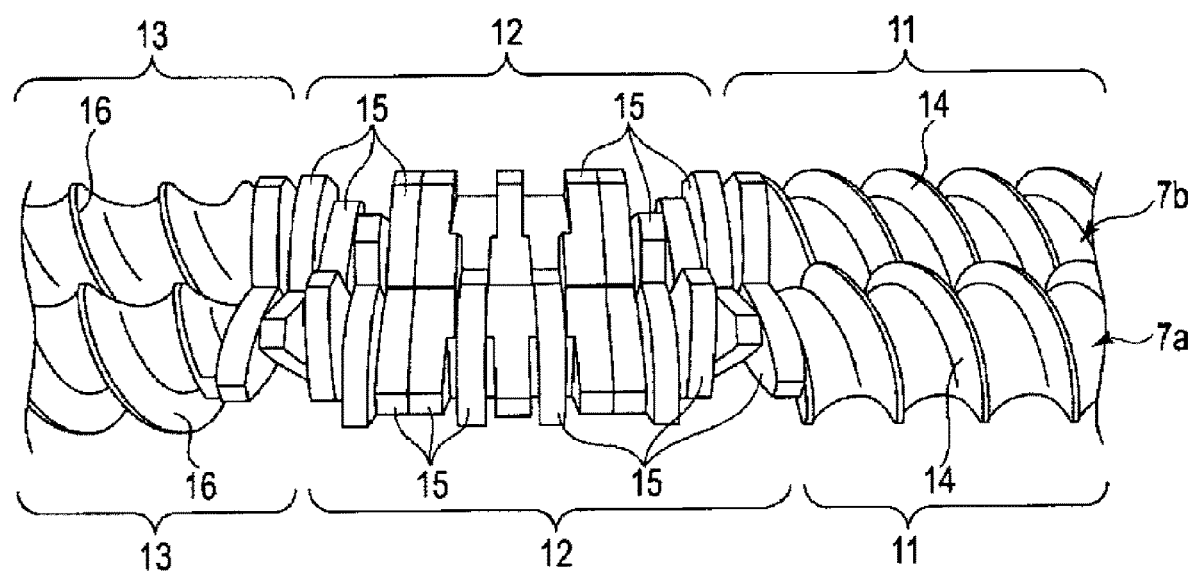
FIG. 3 is a perspective view showing a state where two screws in the twin-screw kneading extrusion unit mesh with each other.

As shown in FIG. 3, the screws 7*a* and 7*b* each include a feed unit 11, a kneading unit 12, and a pumping unit 13. These are arranged in a row along the axial direction of the screws 7a and 7b. The supply port 9b is located between the feed unit 11 and the kneading unit 12, and the fibers 10b are supplied from the supply port 9b by side feeding or the like to be dispersed into the resin 10a.

The feed unit 11 has a helically twisted flight 14. The flights 14 of the screws 7a and 7b rotate in a state of meshing with each other and transport the raw material 10, including the resin 10a supplied from the supply port 9a and the fibers 10b supplied from the supply port 9b, toward the kneading unit 12.

The kneading unit 12 has a plurality of disks 15 arranged in the axial direction of the screws 7a and 7b. The disks 15 of the screws 7a and 7b rotate in a state of facing each other and knead the raw material 10 sent from the feed unit 11. The kneaded raw material 10 is fed to the pumping unit 13 through the rotation of the screws 7a and 7b.

The pumping unit 13 has a helically twisted flight 16. The flights 16 of the screws 7a and 7b rotate in a state of meshing with each other and extrude the fiber-dispersed resin from the discharge end of the barrel 6.

The resin 10a and the fibers 10b supplied to the supply ports 9a and 9b of the twin-screw kneading extrusion unit 2 are melted and kneaded by receiving heat from the heater. At this time, the fibers 10b are opened and uniformly dispersed in the resin 10a to form the fiber-dispersed resin. The fiber-dispersed resin is continuously supplied to the high shear processing unit 3 from the discharge end of the barrel 6, as indicated by the arrow A in FIG. 1.

The fiber-dispersed resin is stably supplied in a predetermined amount with appropriate viscosity from the twin-screw kneading extrusion unit 2 to the high shear processing unit 3. Thus, the burden on the high shear processing unit 3, which performs the molecular weight reduction process following the fiber dispersion process in the twin-screw kneading extrusion unit 2, is able to be reduced. The shear force applied to the raw material 10 by the twin-screw kneading extrusion unit 2 is intended to disperse the fibers 10b in the resin 10a, but at this time, the molecular weight of the resin 10b may decrease. However, the degree to which the molecular weight of the resin 10b is reduced differs significantly between the twin-screw kneading extrusion unit 2 and the high shear processing unit 3. Thus, it is difficult to produce a low-viscosity fiber-reinforced composite material that has the fluidity suitable for injection molding using only the twin-screw kneading extrusion unit 2. In order to produce a low-viscosity fiber-reinforced composite material that has the fluidity suitable for injection molding, it is necessary to reduce the molecular weight to reduce the viscosity of the fiber-dispersed resin through the molecular weight reduction process using the high shear processing unit 3.

Figure 4:
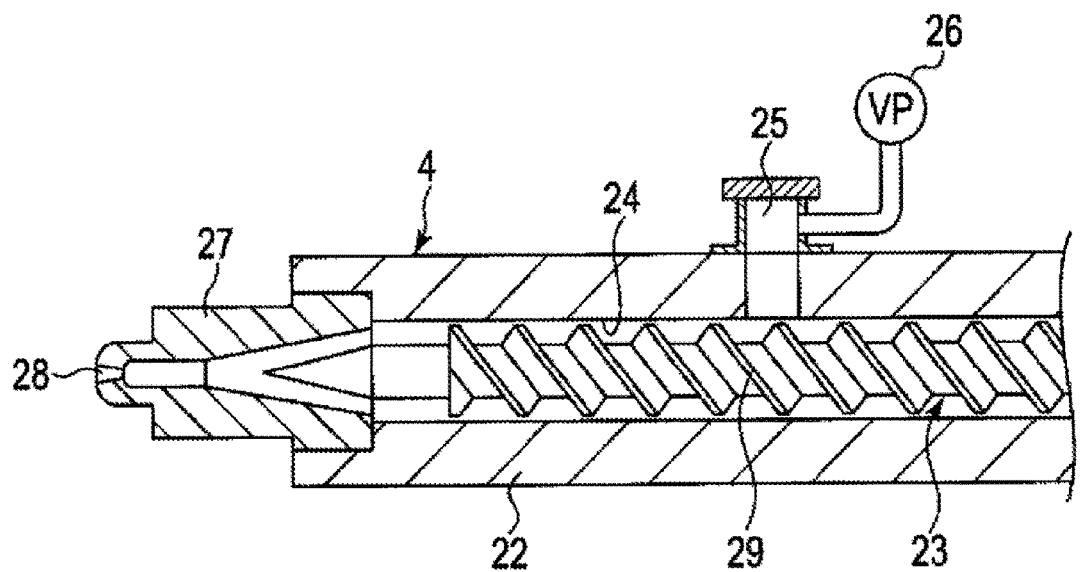
FIG. 4 is a cross-sectional view of the degassing unit.

The degassing unit 4 shown in FIG. 4 is an element for sucking and removing gas components contained in the fiber-reinforced composite material discharged from the high shear processing unit 3. The degassing unit 4 includes a barrel 22 and a single vent screw 23 housed in the barrel 22. The barrel 22 includes a straight cylindrical cylinder unit 24. The sufficiently low molecular weight fiber-reinforced composite material extruded from the high shear processing unit 3 is continuously supplied to the cylinder unit 24 of the barrel 22 from one end side.

The barrel 22 has a vent port 25. The vent port 25 is opened in the middle part of the barrel 22 and is connected to a vacuum pump 26. Furthermore, the other end of the cylinder unit 24 of the barrel 22 is closed by a head unit 27 provided with a discharge port 28.

The vent screw 23 has a helically twisted flight 29, is housed in the cylinder unit 24, and is rotated in one direction by receiving torque transmitted from a motor (not shown). The flight 29 rotates integrally with the vent screw 23 and continuously transports the kneaded material supplied to the cylinder unit 24 toward the head unit 27. When the fiber-reinforced composite material is transported to a position corresponding to the vent port 25, the fiber-reinforced composite material is subjected to the vacuum pressure of the vacuum pump 26. That is, by drawing a negative pressure inside the cylinder unit 24 with the vacuum pump, gaseous substances and other volatile components contained in the fiber-reinforced composite material are continuously sucked and removed from the kneaded material. After the gaseous substances and other volatile components are removed, the fiber-reinforced composite material is discharged from the discharge port of the head unit 27.

Figure 5:
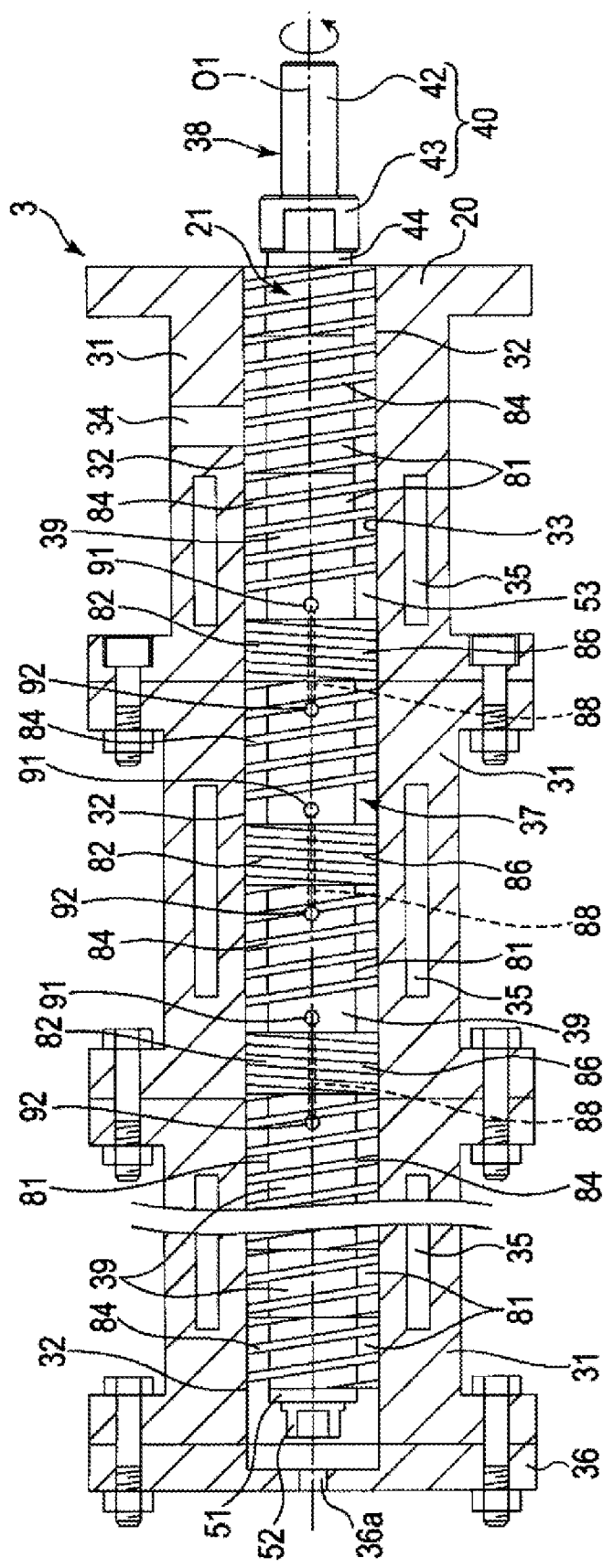
FIG. 5 is a cross-sectional view of the high shear processing unit.
Figure 6:
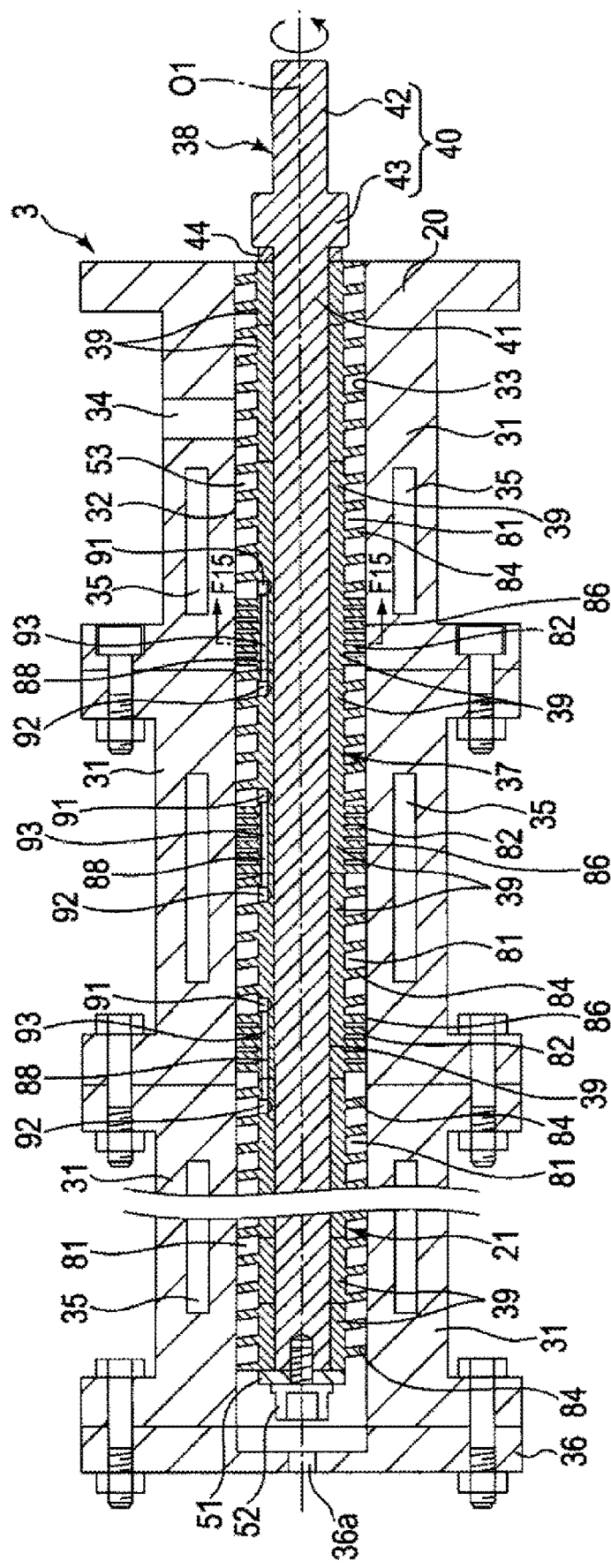
FIG. 6 is a cross-sectional view of the high shear processing unit, which shows both the barrel and the screw in cross section.

As shown in FIG. 5 and FIG. 6, the high shear processing unit 3 is a single-screw extruder for reducing the molecular weight of the fiber-dispersed resin, and includes a barrel 20 and a single screw 21. The screw 21 imparts a shearing action to the fiber-dispersed resin supplied from the twin-screw kneading extrusion unit 2. The barrel 20 has a straight cylindrical shape, and is arranged horizontally. The barrel 20 is divided into a plurality of barrel elements 31.

Each barrel element 31 has a cylindrical through hole 32. The barrel elements 31 are integrally connected by bolt fastening so that the respective through holes 32 are coaxially continuous. The through holes 32 of the barrel elements 31 cooperatively define a cylindrical cylinder unit 33 inside the barrel 20. The cylinder unit 33 extends in the axial direction of the barrel 20.

A supply port 34 is formed at one end along the axial direction of the barrel 20. The supply port 34 communicates with the cylinder unit 33, and the fiber-dispersed resin melted by the twin-screw kneading extrusion unit 2 is continuously supplied to the cylinder unit 33.

The barrel 20 is provided with a heater (not shown). The heater adjusts the temperature of the barrel 20 as required. The barrel 20 includes a coolant passage 35 arranged to surround the cylinder unit 33. A coolant flows along the coolant passage 35 when the temperature of the barrel 20 exceeds a predetermined upper limit value, and forcibly cools the barrel 20. For example, water and oil may be used as the coolant.

The other end along the axial direction of the barrel 20 is closed by a head unit 36. The head unit 36 has a discharge port 36a. The discharge port 36a is located on the opposite side along the axial direction of the barrel 20 with respect to the supply port 34, and is connected to the degassing unit 4.

The screw 21 has a linear axis along the transporting direction of the fiber-dispersed resin and is provided with a screw body 37. The screw body 37 is composed of a single rotating shaft 38 and a plurality of cylindrical bodies 39.

The rotating shaft 38 includes a first shaft unit 40 and a second shaft unit 41. The first shaft unit 40 is located at the base end of the rotating shaft 38 on the side of one end of the barrel 20. The first shaft unit 40 includes a coupling unit 42 and a stopper unit 43. The coupling unit 42 is connected to a driving source such as a motor via coupling (not shown). The stopper unit 43 is coaxially provided on the coupling unit 42. The stopper unit 43 has a larger diameter than the coupling unit 42.

The second shaft unit 41 extends coaxially from an end surface of the stopper unit 43 of the first shaft unit 40. The second shaft unit 41 has a length extending over substantially the entire length of the barrel 20 and has a tip facing the head unit 36. A straight axis O1, which penetrates the first shaft unit 40 and the second shaft unit 41 coaxially, extends horizontally in the axial direction of the rotating shaft 38.

A transporting unit 81 and a barrier unit 82 may have either a configuration with only one set or a configuration with multiple sets. In either case, it is possible to suppress excessive thermal degradation of the fiber-dispersed resin by passing through the passage 88 immediately after molecular weight reduction. The supply port 34 of the barrel 20 is open toward the transporting unit 81 arranged on the side of the base end of the screw body 37.

Each transporting unit 81 has a helically twisted flight 84. The flight 84 protrudes from the outer peripheral surface along the circumferential direction of the cylindrical body 39 toward a transporting path 53. The flight 84 is twisted so that when the screw 21 rotates counterclockwise (left rotation) as viewed from the base end of the screw body 37, the flight 84 transports the raw material from the base end to the tip of the screw body 37. That is, the flight 84 is twisted to the right so that the flight 84 has the same twisting direction as a right-handed screw.

Each barrier unit 82 has a helically twisted flight 86. The flight 86 protrudes from the outer peripheral surface along the circumferential direction of the cylindrical body 39 toward the transporting path 53. The flight 86 is twisted so that when the screw 21 rotates counterclockwise (left rotation) as viewed from the base end of the screw body 37, the flight 86 transports the fiber-dispersed resin from the tip to the base end of the screw body 37. That is, the flight 86 is twisted to the left so that the flight 86 has the same twisting direction as a left-handed screw, and is a reverse screw in the opposite direction of the flight 84.

The twist pitch of the flight 86 of each barrier unit 82 is set to be the same as or smaller than the twist pitch of the flight 84 of the transporting unit 81. Furthermore, a slight clearance is secured between the tops of the flights 84 and 86 and the inner peripheral surface of the cylinder unit 33 of the barrel 20.

It is preferable to set the clearance between the outer diameter part (tops of the flights 84 and 86) of the barrier unit 82 and the inner peripheral surface of the cylinder unit 33 within a range of 0.1 mm or more and 2 mm or less. More preferably, the clearance is set within a range of 0.1 mm or more and 0.7 mm or less. Thereby, it is possible to restrict the fiber-dispersed resin from being transported through the clearance.

The screw body 37 has a plurality of passages 88 extending in the axial direction of the screw body 37 as screw elements. When one barrier unit 82 and two transporting units 81 sandwiching the barrier unit 82 are considered as one unit, the passage 88 is formed across the barrier unit 82 of each unit in the cylindrical bodies 39 of both transporting units 81. In this case, the passages 88 are aligned in a single row at predetermined intervals (for example, equal intervals) on the same straight line along the axial direction of the screw body 37. The passages 88 are provided in the barrier unit 82 sandwiched between the transporting units 81.

Each cylindrical body 39 is configured so that the second shaft unit 41 penetrates coaxially.

The second shaft unit 41 has a solid columnar shape with a smaller diameter than the stopper unit 43.

Figure 7:
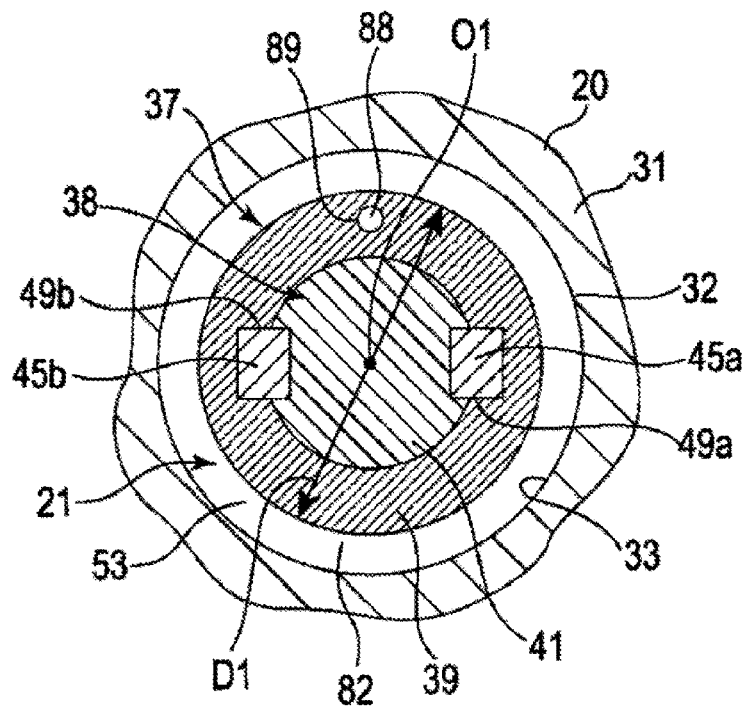
FIG. 7 is a cross-sectional view along the line F15-F15 of FIG. 6.

As shown in FIG. 7, a pair of keys 45a and 45b are attached to the outer peripheral surface of the second shaft unit 41. The keys 45a and 45b extend in the axial direction of the second shaft unit 41 at positions shifted by 180° in the circumferential direction of the second shaft unit 41.

Figure 8:
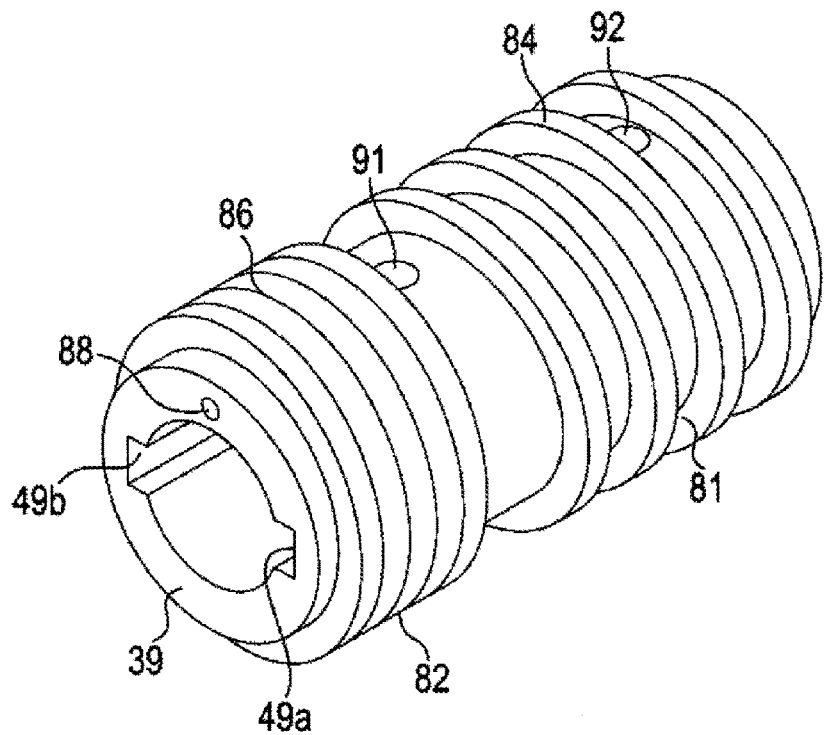
FIG. 8 is a perspective view of the cylindrical body.

As shown in FIG. 8, a pair of key grooves 49a and 49b are formed on the inner peripheral surface of the cylindrical body 39. The key grooves 49a and 49b extend in the axial direction of the cylindrical body 39 at positions shifted by 180° in the circumferential direction of the cylindrical body 39.

The cylindrical body 39 is inserted onto the second shaft unit 41 from the direction of the tip of the second shaft unit 41 with the key grooves 49a and 49b matching the keys 45a and 45b of the second shaft unit 41. A first collar 44 is interposed between the cylindrical body 39 that is first inserted onto the second shaft unit 41 and the end surface of the stopper unit 43 of the first shaft unit 40. Furthermore, after all the cylindrical bodies 39 are inserted onto the second shaft unit 41, a fixing screw 52 is screwed into the tip surface of the second shaft unit 41 via a second collar 51 (see FIG. 5 and FIG. 6). With this screwing, all the cylindrical bodies 39 are tightened in the axial direction of the second shaft unit 41 between the first collar 44 and the second collar 51, and the end surfaces of adjacent cylindrical bodies 39 are in close contact without gaps.

The passage 88 is provided at an eccentric position from the axis O1 of the rotating shaft 38 inside the cylindrical body 39. In other words, the passage 88 is displaced from the axis O1, and revolves around the axis O1 when the screw body 37 rotates.

The passage 88 is, for example, a hole having a circular cross-sectional shape. The passage 88 is configured as a hollow space that allows only the flow of the fiber-dispersed resin. A wall surface 89 of the passage 88 revolves around the axis O1 without rotating about the axis O1 when the screw body 37 rotates.

When the passage 88 is a hole having a circular cross-sectional shape, the diameter of the circle may be, for example, about 1 to 5 mm. In addition, the distance (length L2, see FIG. 9) of the passage 88 may be, for example, about 15 to 90 mm. From the viewpoint of allowing the fiber-dispersed resin to pass smoothly and increasing the filling rate in these transporting units 81, the diameter of the circle of the cross section of the passage 88 is preferably 1 to 3 mm, and the distance of the passage 88 is preferably 40 to 60 mm.

Figure 9:
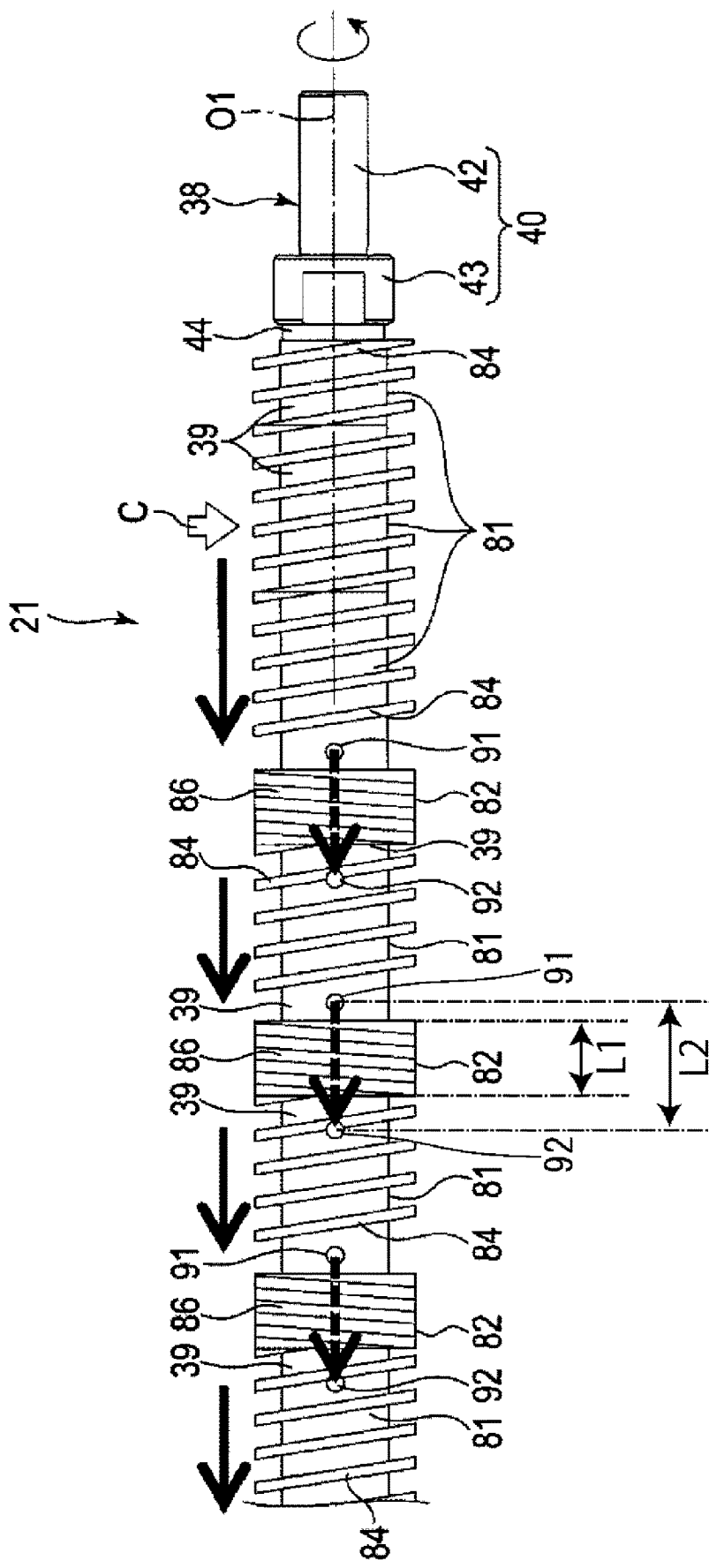
FIG. 9 is a side view showing the flow direction of the fiber-dispersed resin with respect to the screw.

As shown in FIG. 9, the screw body 37 has, as screw elements, a plurality of transporting units 81 for transporting the fiber-dispersed resin, and a plurality of barrier units 82 for restricting the flow of the fiber-dispersed resin. That is, a plurality of transporting units 81 are arranged at the base end of the screw body 37 corresponding to one end of the barrel 20, and a plurality of transporting units 81 are arranged at the tip of the screw body 37 corresponding to the other end of the barrel 20. Furthermore, between these transporting units 81, the transporting units 81 and the barrier units 82 are arranged alternately in the axial direction from the base end to the tip of the screw body 37. The number of times the molecular weight reduction process is performed by the high shear processing unit 3 is determined by the number of sets of the transporting units 81 and the barrier units 82 arranged.

As indicated by the arrow C in FIG. 9, the fiber-dispersed resin supplied to the high shear processing unit 3 is introduced onto the outer peripheral surface of the transporting unit 81 located on the side of the base end of the screw body 37. At this time, when the screw 21 rotates counterclockwise (left rotation) as viewed from the base end of the screw body 37, the flight 84 of the transporting unit 81 continuously transports the fiber-dispersed resin toward the tip of the screw body 37, as indicated by the solid arrow in the drawing.

The transporting units 81 and the barrier units 82 are arranged alternately in the axial direction of the screw body 37, and the passages 88 are provided at intervals in the axial direction of the screw body 37. Thus, when the fiber-dispersed resin introduced from the supply port 34 into the screw body 37 is transported in the direction from the base end to the tip of the screw body 37 while repeatedly receiving the shearing action intermittently, the molecular weight is reduced.

Figure 10:
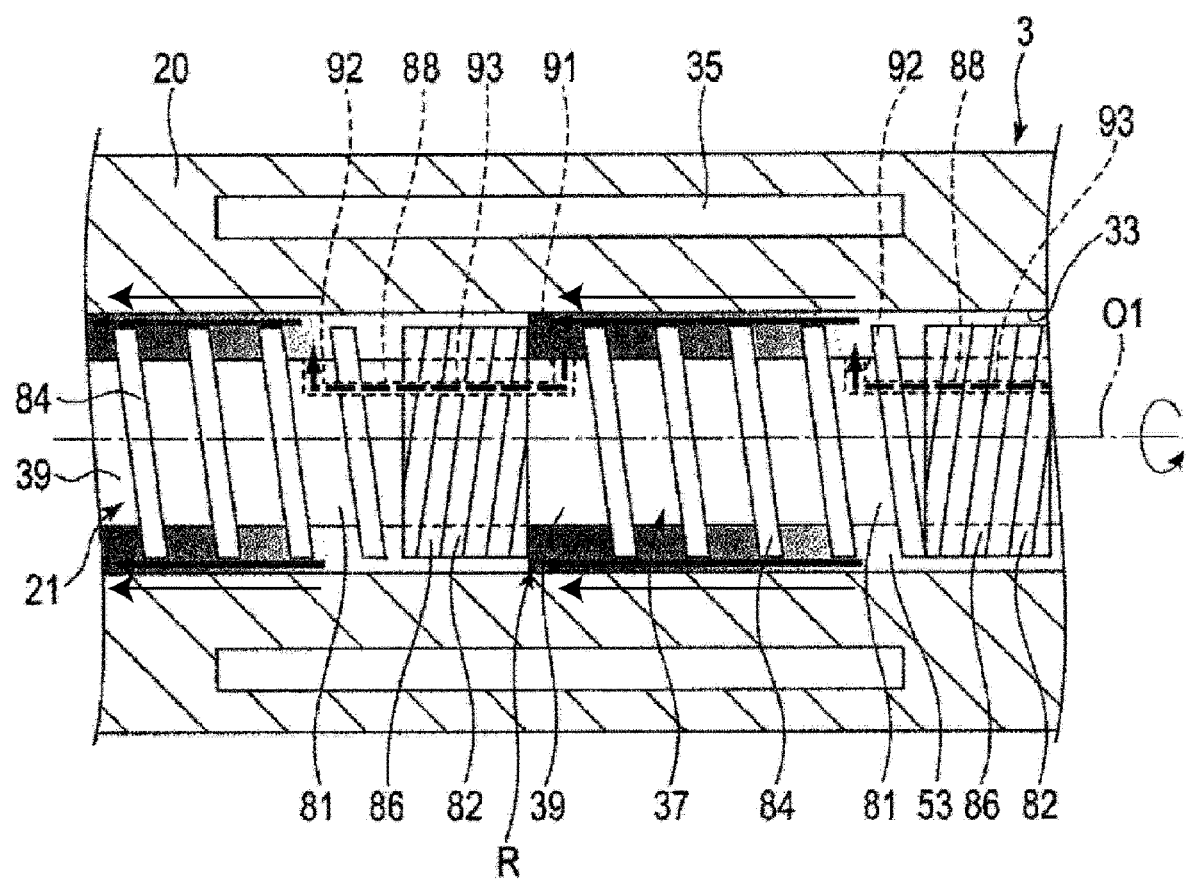
FIG. 10 is a cross-sectional view of the high shear processing unit, which shows the flow direction of the fiber-dispersed resin when the screw rotates.

As shown in FIG. 10, each passage 88 has an inlet 91, an outlet 92, and a passage body 93. The inlet 91 and the outlet 92 are connected by the passage body 93 and are provided close to both sides of one barrier unit 82. In another way of understanding, in one transporting unit 81 adjacent to the space between two adjacent barrier units 82, the inlet 91 is opened on the outer peripheral surface near the downstream end of the transporting unit 81, while the outlet 92 is opened on the outer peripheral surface near the upstream end of the transporting unit 81. The inlet 91 and the outlet 92, which are opened on the outer peripheral surface of the same transporting unit 81, are not connected by the passage body 93. The inlet 91 communicates with the outlet 92 of the adjacent downstream transporting unit 81 via the barrier unit 82, and the outlet 92 communicates with the inlet 91 of the adjacent upstream transporting unit 81 via the barrier unit 82.

When the fiber-dispersed resin passes through the passage 88, the shear force applied by the screw 21 is not applied to the fiber-dispersed resin. In order to enhance the cooling effect when the fiber-dispersed resin passes through the passage 88, a coolant passage (not shown) extending coaxially along the axis O1 of the rotating shaft 38 may be formed inside the rotating shaft 38. When forming the coolant passage, the coolant passage can have a structure in which one end is connected to an outlet pipe and the other end is liquid-tightly blocked by the tip of the rotating shaft 38. A coolant introduction pipe may be inserted coaxially into the coolant passage. In this way, since the coolant circulates along the axial direction of the rotating shaft 38, the cooling efficiency when passing through the passage 88 using the coolant is improved.

In FIG. 10, the filling rate of the fiber-dispersed resin at the location corresponding to the transporting unit 81 of the screw body 37, among the transporting units 81, is represented by gradation (shades). That is, in the transporting unit 81, the higher the filling rate, the darker the color tone. In the transporting unit 81, the filling rate increases as it approaches the barrier unit 82, and the filling rate becomes 100% right before the barrier unit 82. In this way, a high shear force is applied to the fiber-dispersed resin with a filling rate of about 100% in the vicinity of the resin reservoir R by the rotation of the screw 21, which makes it possible to reduce the molecular weight of the fiber-dispersed resin.

In the resin reservoir R, the pressure increases due to the flow being dammed up. The fiber-dispersed resin with increased pressure continuously flows into the passage 88 from the inlet 91 opened on the outer peripheral surface of the transporting unit 81, as indicated by the dashed arrow in FIG. 10, and continuously flows within the passage 88. The filling length, which is the length along the transporting direction in which the fiber-dispersed resin is filled, is defined by the positional relationship between the passage 88 and the barrier unit 82.

As shown in FIG. 10, the length L2 of the passage 88 (see FIG. 9) needs to be larger than the length L1 of the barrier unit 82 spanned by the passage 88. However, from the viewpoint of reducing the flow resistance when the fiber-dispersed resin passes through the passage 88, the length L2 is preferably 2 times or less than the length L1 of the barrier unit 82 spanned by the passage 88, more preferably 1.5 times or less, and even more preferably 1.3 times or less.

Conditions for molecular weight reduction include, for example, the rotation speed of the screw body 37, the inner diameter and distance of the passage 88, the number of times shearing action is applied, etc. The number of times the transport is restricted (the number of resin reservoirs R) is defined by the number of barrier units 82 provided with the passage 88 between the screw bodies 37 in the high shear processing unit 3.

The screw 21 rotates under the torque from the driving source. The rotation speed of the screw 21 suitable for molecular weight reduction varies depending on the outer diameter of the screw 21. Generally, as the outer diameter of the screw 21 becomes smaller, the suitable rotation speed tends to increase. When using a screw 21 having an outer diameter of 30 mm or more and 50 mm or less and having a height of the flight 84, that is, a groove depth of 2 mm or more and 4 mm or less, by setting the rotation speed of the screw 21 to 1000 rpm or more and 3600 rpm or less, a low-viscosity fiber-reinforced composite material that forms a high-strength molded product is obtained. From the viewpoint of increasing the strength of the molded product, the rotation speed of the screw 21 is preferably 1000 rpm or more and 3000 rpm or less, and more preferably 1500 rpm or more and 3000 rpm or less.

Furthermore, by setting the shear rate to 850 (/second) or more and 3000 (/second) or less, a low-viscosity fiber-reinforced composite material that forms a high-strength molded product is obtained. From the viewpoint of increasing the strength of the molded product, the shear rate of the screw 21 is preferably 850 (/second) or more and 2500 (/second) or less, and more preferably 1250 (/second) or more and 2500 (/second) or less.

Figure 11:
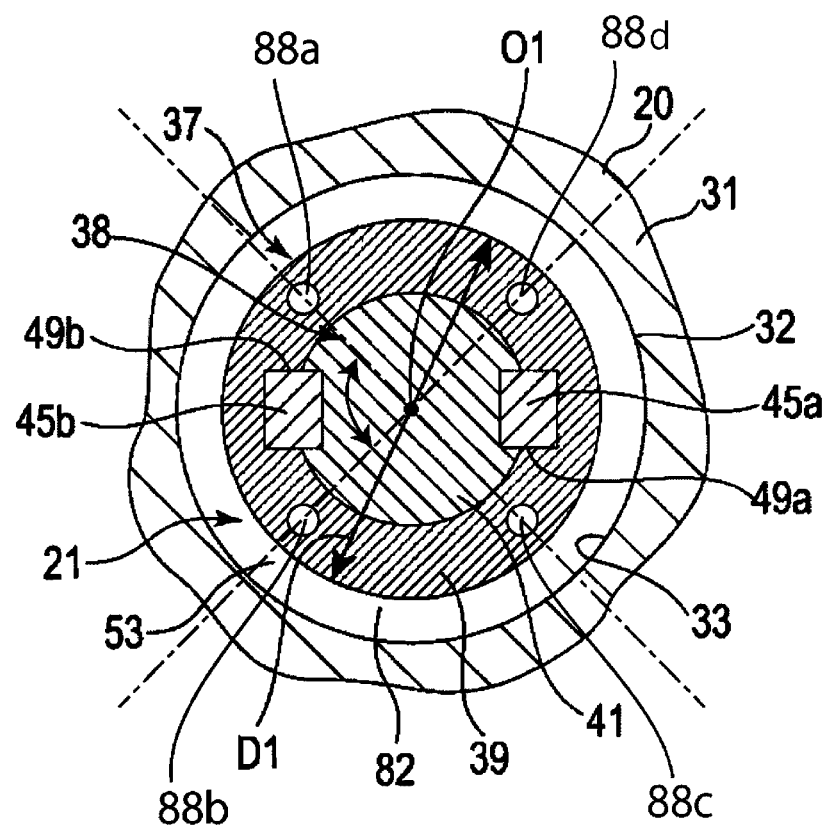
FIG. 11 is a cross-sectional view of the portion corresponding to FIG. 7, which shows an example in which multiple passages are arranged in parallel.

As shown in FIG. 11, it is preferable that a plurality of passages 88 are arranged parallel and evenly inside the screw body 37. In this case, the inlet 91 and the outlet 92 (see FIG. 8) of the passage 88 are also provided evenly on the outer peripheral surface of the screw body 37.

FIG. 11 shows an example in which four passages 88a, 88b, 88c, and 88d are provided in parallel to each other inside the screw body 37. As shown in the drawing, an even arrangement of a plurality of passages 88 means that the angles between the lines connecting the axis (center point) O1 of the cross section of the screw body 37 and the adjacent passages 88 are equal. The angle between the lines connecting the axis O1 and the adjacent passages 88 is 90° when there are four passages 88, and 180° when there are two passages 88. D1 indicates the outer diameter of the screw body 37.

As described above, the production method of the present invention further includes the molecular weight reduction process that reduces the molecular weight of the fiber-dispersed resin using the high shear processing unit 3, after dispersing fibers in the resin by the twin-screw kneading extrusion unit 2 to form the fiber-dispersed resin. Thus, it is possible to produce a low-viscosity fiber-reinforced composite material with high fluidity suitable for injection molding while maintaining good mechanical properties (mechanical characteristics) of the molded product obtained by injection molding. For example, even when glass fibers are contained at 30% by weight or more in 100% by weight of a fiber-reinforced composite material that contains polypropylene as the resin, it is still possible to produce a low-viscosity fiber-reinforced composite material with high fluidity that has a spiral length of 100 cm or more, which is an indicator of moldability. Furthermore, it is possible to control the viscosity of the fiber-reinforced composite material by the rotation speed of the high shear processing unit 3.

EXAMPLE

Fiber-reinforced composite materials were produced using a continuous high shear processing device. The raw materials used, the configuration of each unit, and the production conditions are described below.
<Raw Material>
  Resin: F704NP (trade name, manufactured by Prime Polymer, Mw 451,000, polypropylene (PP))
  Fiber (filler): glass fiber (GF)
<Twin-Screw Kneading Extrusion Unit (for Fiber Dispersion Process): TEM26SX (Manufactured by Shibaura Machine Co., Ltd.)>
  Configuration: feed unit, first kneading unit, first pumping unit, second kneading unit, and second pumping unit
  Rotation speed: 250 rpm (rotations per minute)
  Barrel temperature: 195° C.
  Supply amount (extrusion amount): 20 kg/hour
<High Shear Processing Unit (for Molecular Weight Reduction Process)>
  Screw diameter of barrel unit (D, outer diameter): 48 mm
  Groove depth of screw (height of flight): 3 mm
  Screw effective length of barrel unit (screw effective length L/screw diameter D): 6.25
  Passage length (L2, see FIG. 9) 45 mm, circular cross section, diameter 2 mm, number of passages 4 (arranged parallel and evenly)
  Rotation speed: 500 rpm, 800 rpm, 1000 rpm, 2000 rpm, 3000 rpm, and 3500 rpm
  Number of dams: 1
  Supply amount (extrusion amount): 20 kg/hour Examples 1 to 8, Comparative Examples 1, 2, 5, and 6

The resin and fibers were kneaded using the twin-screw kneading extrusion unit 2 of the continuous high shear processing device 1 shown in FIG. 1 according to the ratios and conditions shown in the table below to obtain the fiber-dispersed resin. Then, the fiber-dispersed resin was subjected to molecular weight reduction using the high shear processing unit 3 of the continuous high shear processing device 1 according to the conditions shown in the table below to produce the fiber-reinforced composite material.

Comparative Examples 3, 4, 7, and 8

The resin and fibers were kneaded using a twin-screw kneading extruder equipped with only the twin-screw kneading extrusion unit 2 according to the ratios and conditions shown in the table below to produce the fiber-reinforced composite material. In Comparative Examples 4 and 8, the temperature of the second pumping unit in the twin-screw kneading extruder was set to 300° C. to produce the fiber-reinforced composite material.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Raw material (weight ratio) | Resin:fiber | 7:3 | 7:3 | 7:3 | 7:3 | 7:3 | 7:3 | 7:3 | 7:3 |
| Fiber dispersion process | Rotation speed (rpm) | 250 | 250 | 250 | 250 | 250 | 250 | 250 | 250 |
|  | Temperature (° C.) | 195 | 195 | 195 | 195 | 195 | 195 | 195 | 195 + 300 |
| Molecular weight reduction process | Rotation speed (rpm) | 1000 | 2000 | 3000 | 3500 | 500 | 800 | — | — |
|  | Temperature (° C.) | 195 | 195 | 195 | 195 | 195 | 195 | — | — |
| Mechanical properties | Weight-average molecular weight | 230000 | — | 143000 | — | — | — | 392000 | — |
|  | Viscosity (Pa · s) | 1530 | 419 | 250 | 161 | 3282 | 2205 | 13300 | 4760 |
|  | Spiral length (cm) | 88 | 119 | 144 | 151 | 73 | 79 | 65 | 93 |
|  | Fiber length (μm, pellet) | 516 | 533 | 532 | 513 | 494 | 473 | 713 | 781 |
|  | Fiber length (μm, test piece) | 481 | 508 | 491 | 470 | 486 | 465 | 525 | 585 |
|  | Tensile strength (MPa) | 57.4 | 55.6 | 53.3 | 50.9 | 49.3 | 50.5 | 50.5 | 60.2 |
|  | Tensile elastic modulus (GPa) | 5.78 | 5.92 | 5.80 | 5.54 | 5.52 | 5.61 | 5.69 | 5.83 |
|  | Tensile elongation (%) | 2.16 | 2.25 | 2.12 | 1.76 | 1.46 | 1.58 | 1.86 | 2.33 |
|  | Bending strength (MPa) | 74.5 | 75.2 | 72.2 | 74.6 | 65.5 | 67.3 | 70.2 | 85.2 |
|  | Bending elastic modulus (GPa) | 4.84 | 4.94 | 4.87 | 5.73 | 4.7 | 4.81 | 4.9 | 5.5 |

—: None

TABLE 2

|  |  | Example | | | | Comparative Example | | | |
| --- | --- | --- | --- | --- | --- | --- | --- | --- | --- |
|  |  | 5 | 6 | 7 | 8 | 5 | 6 | 7 | 8 |
| Raw material (weight ratio) | Resin:fiber | 9:1 | 9:1 | 9:1 | 9:1 | 9:1 | 9:1 | 9:1 | 9:1 |
| Fiber dispersion process | Rotation speed (rpm) | 250 | 250 | 250 | 250 | 250 | 250 | 250 | 250 |
|  | Temperature (° C.) | 195 | 195 | 195 | 195 | 195 | 195 | 195 | 195 + 300 |
| Molecular weight reduction process | Rotation speed (rpm) | 1000 | 2000 | 3000 | 3500 | 500 | 800 | — | — |
|  | Temperature (° C.) | 195 | 195 | 195 | 195 | 195 | 195 | — | — |
| Mechanical properties | Weight-average molecular weight | 248000 | — | 159000 | — | — | — | 412000 | — |
|  | Viscosity (Pa · s) | 1160 | 310 | 209 | 125 | 3321 | 1604 | 11300 | 1830 |
|  | Spiral length (cm) | 95 | 127 | 149 | 168 | 81 | 86 | 71 | 99 |
|  | Fiber length (μm, pellet) | 727 | 762 | 790 | 778 | 729 | 710 | 952 | 920 |
|  | Fiber length (μm, test piece) | 642 | 679 | 773 | 675 | 697 | 619 | 623 | 867 |
|  | Tensile strength (MPa) | 38.9 | 39.3 | 40.5 | 39.7 | 39.0 | 39.1 | 40.5 | 42.6 |
|  | Tensile elastic modulus (GPa) | 2.96 | 2.89 | 3.06 | 3.11 | 3.01 | 3.06 | 3.15 | 2.83 |
|  | Tensile elongation (%) | 3.07 | 1.71 | 2.07 | 2.58 | 2.55 | 2.96 | 2.83 | 2.52 |
|  | Bending strength (MPa) | 53.7 | 55.4 | 57.3 | 50.4 | 50.3 | 49.9 | 56.4 | 58.6 |
|  | Bending elastic modulus (GPa) | 2.18 | 2.27 | 2.35 | 1.86 | 1.81 | 2.01 | 2.4 | 2.15 |

—: None

<Evaluation Method of Mechanical Properties>

The results of the measurements using the following evaluation method for the fiber-reinforced composite materials produced as described above are shown in Table 1, Table 2, and FIG. 12 to FIG. 14.

[Viscosity]

Device: rotary rheometer MCR102 manufactured by Anton Paar

Measurement method: zero-shear viscosity measured at the temperature of 200° C.

[Spiral Length (Fluidity)]

The distance (length of the swirl) that the sample resin flowed within the mold when injection molded into a spiral mold using an injection molding machine was measured. The injection molding machine used was Shibaura Machine EC100N.

Molding temperature: 235° C.
Injection pressure (primary/secondary): 99 MPa/70 MPa
Screw rotation speed: 100 rpm
Mold cooling temperature: 50° C.
Mold: spiral mold (flow path cross section: semicircular/radius 2.38 mm, maximum 168 cm)

[Average Fiber Length (D50) (Pellet)]

Pellets of the fiber-reinforced composite material were placed in an air atmosphere at 500° C. to remove the resin and collect the glass fibers. The obtained glass fibers were introduced into a shape/particle size distribution measurement device (PartAn SI, manufactured by Microtrac BEL), and the fiber length distribution was measured to determine the median of the fiber length (D50).

[Fiber Length (Test Piece)]

The molded product (test piece) produced by injection molding the fiber-reinforced composite material was subjected to the same method as for the above-mentioned pellets to collect the glass fibers, measure the fiber length distribution, and determine the median of the fiber length (D50).

[Tensile Strength]

Measurement was performed in accordance with JIS K 7161.

A dumbbell-shaped test specimen with a central width of 10 mm, a length of 175 mm, and a thickness of 4 mm was prepared by injection molding. The shape of the test specimen was set as dumbbell-shaped 1A type. The tensile test was performed using a desktop precision universal testing machine (Autograph AG-50 kN type, manufactured by Shimadzu Corporation), with a crosshead speed of 5 mm/min, to apply a load until the test specimen broke. The tensile strength was calculated from the following equation.

$$F = P/W \times D$$

F: strength (MPa)
P: breaking load (MPa)
W: width of test specimen (mm)
D: thickness of test specimen (mm)

[Tensile Elastic Modulus]

The tensile test was measured in accordance with JIS K 7161. The tensile elastic modulus was determined using a test specimen prepared by the same method as for tensile strength, and was calculated from the stress-strain relationship obtained in the test and from the slope of the stress/strain curve corresponding to the strain between ε1 and ε2. The strain was measured with a calibrated extensometer (manufactured by Epsilon) before measurement.

$$E = ((\sigma 2 - \sigma 1)/(\varepsilon 2 - \varepsilon 1))/1000$$

E: elastic modulus (GPa)
ε1: strain 0.1% (0.001)
ε2: strain 0.3% (0.003)
σ1: stress at ε1 (MPa)
β2: stress at ε2 (MPa)

[Bending Strength]

Measurement was performed in accordance with JIS K 7171.

A test specimen in the shape of a strip with a width of 10 mm, a length of 80 mm, and a thickness of 4 mm was prepared by injection molding. The bending test was performed as a three-point bending test using a desktop precision universal testing machine (Autograph AG-50 kN type, manufactured by Shimadzu Corporation). The crosshead speed was set to 2 mm/min to apply a load until the test specimen broke. The bending strength was calculated from the following equation.

$$F=3\times P\times L/2\times W\times D^2$$

F: strength (MPa)
P: breaking load (MPa)
L: inter-fulcrum distance 64 mm
W: width of test specimen (mm)
D: thickness of test specimen (mm)

[Bending Elastic Modulus]

Measurement was performed in accordance with JIS K 7171.

A test specimen in the shape of a strip with a width of 10 mm, a length of 80 mm, and a thickness of 4 mm was prepared by injection molding. The bending test was performed as a three-point bending test using a desktop precision universal testing machine (Autograph AG-50 kN type, manufactured by Shimadzu Corporation). The crosshead speed was set to 2 mm/min to apply a load until the test specimen broke. The bending elastic modulus was calculated from the stress-strain relationship obtained in the test and from the slope of the stress/strain curve corresponding to the strain between ε1 and ε2.

$$E=((\sigma 2-\sigma 1)/(\varepsilon 2-\varepsilon 1))/1000$$

E: elastic modulus (GPa)
ε1: strain 0.05% (0.0005)
ε2: strain 0.25% (0.0025)
σ1: stress at ε1 (MPa)
σ2: stress at ε2 (MPa)

As shown in Tables 1 and 2, the molecular weight reduction process performed using the high shear processing unit of the continuous high shear processing device reduced the weight-average molecular weight of the fiber-reinforced composite material, decreased the viscosity, and increased the fluidity. In addition, there is a correlation between the rotation speed of the screw body in the molecular weight reduction process and the viscosity of the fiber-reinforced composite material. By increasing the rotation speed, the viscosity of the fiber-reinforced composite material decreased and the fluidity increased.

The fiber length of the fibers in the fiber-reinforced composite material increased as the rotation speed increased. It is considered that this is because the molecular weight of polypropylene rapidly decreased due to shear heat generation in the high shear processing unit of the continuous high shear processing device. That is, it can be inferred that the rapid decrease in the viscosity of the fiber-reinforced composite material in the molecular weight reduction process weakened the shear stress applied to the glass fibers, thereby suppressing breakage of the fibers.

As shown in Tables 1 and 2, in comparison with Comparative Examples 3 and 7 in which only the fiber dispersion process was performed using a twin-screw kneading extruder alone, the fiber-reinforced composite materials of Examples 1 to 4 and 5 to 8, which were subjected to the molecular weight reduction process using a continuous high shear processing device, formed molded products with equal or better mechanical properties, as a result of suppressing fiber breakage, in spite of improved fluidity.

Regarding the fiber-reinforced composite materials of Comparative Examples 4 and 8, in which the fiber dispersion process and the molecular weight reduction process were performed using a twin-screw kneading extruder alone, it is considered that the long fiber length and good fiber orientation contributed to the improvement of fluidity. It can be seen that by performing the molecular weight reduction process using a continuous high shear processing device, it is possible to produce an ultra-low viscosity fiber reinforced composite material, which cannot be realized with use of a twin-screw kneading extruder alone.

Figure 12:
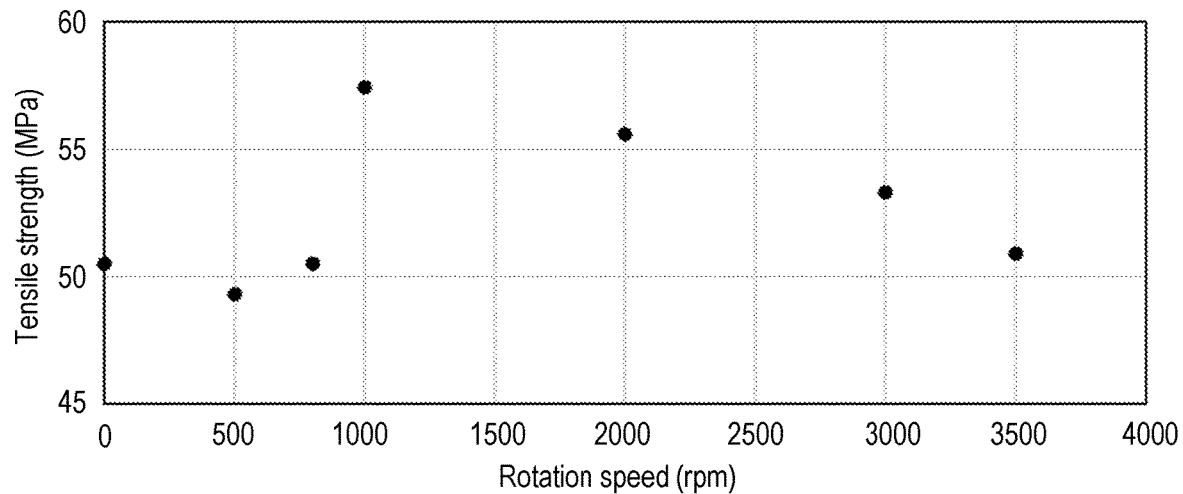
FIG. 12 is a graph showing the relationship between the rotation speed of the screw body and the tensile strength of the molded product of the fiber-reinforced composite material.
Figure 13:
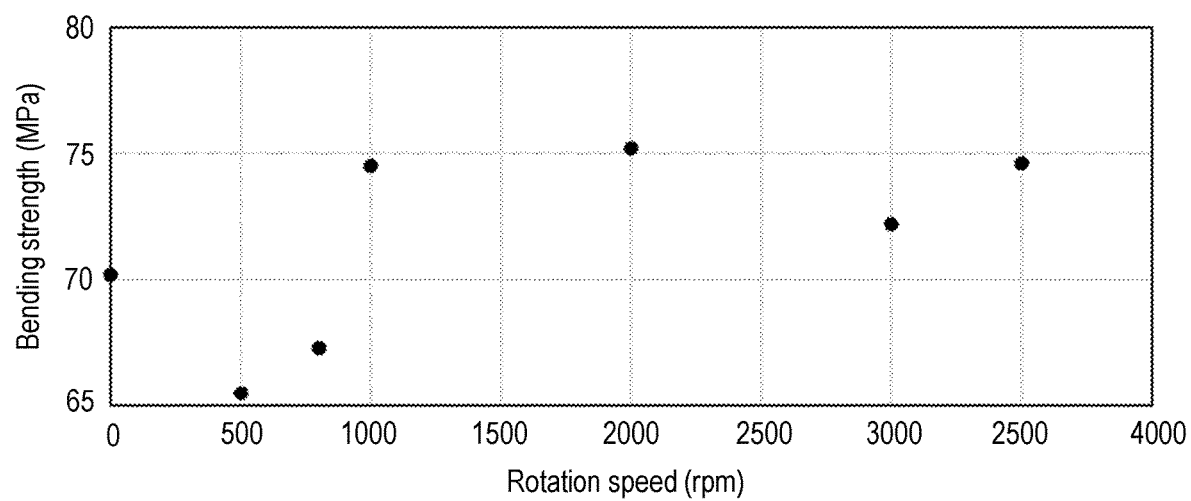
FIG. 13 is a graph showing the relationship between the rotation speed of the screw body and the bending strength of the molded product of the fiber-reinforced composite material.
Figure 14:
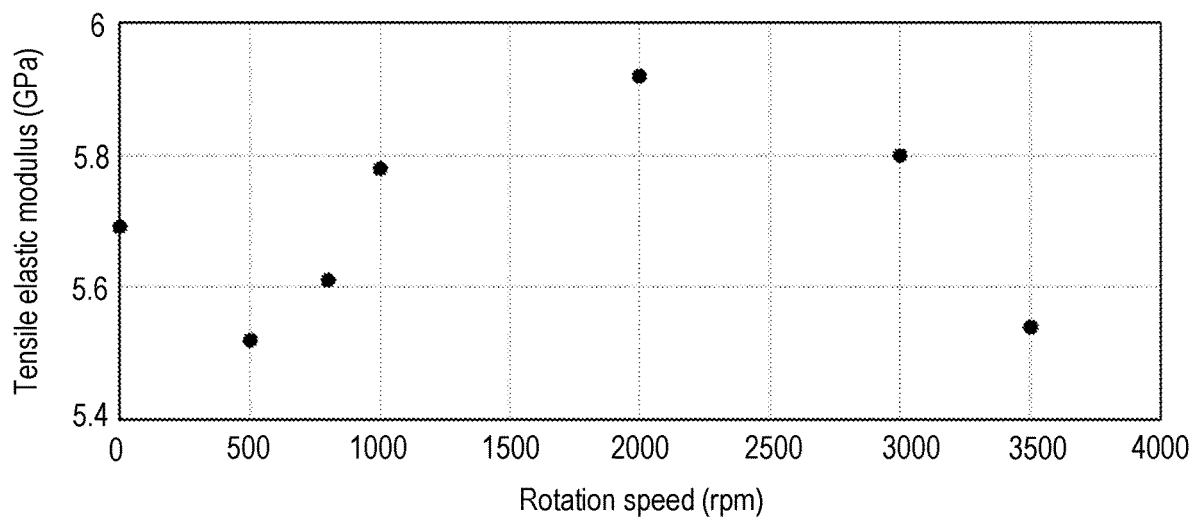
FIG. 14 is a graph showing the relationship between the rotation speed of the screw body and the tensile elastic modulus of the molded product of the fiber-reinforced composite material.

FIG. 12 to FIG. 14 are graphs of the measurement results for Examples 1 to 4 and Comparative Examples 1 to 3, and show the relationship between the rotation speed of the screw body in the molecular weight reduction process and the tensile strength, bending strength, and tensile elastic modulus of the molded product. In these graphs, the measurement result for the molded product of the fiber-dispersed resin of Comparative Example 3, which was not subjected to the molecular weight reduction process, is shown with the rotation speed as 0. As shown in FIG. 12 to FIG. 14, the molded products of the fiber-reinforced composite materials of Examples 1 to 4, in which the molecular weight reduction process was performed with the rotation speed of the screw body set to 1000 rpm or more and 3500 rpm or less, had improved tensile strength and bending strength compared to the molded product of Comparative Example 3.

By setting the rotation speed of the screw body to 1000 rpm or more, the tensile strength and bending strength of the molded product became higher than in Comparative Example 3 in which only the fiber dispersion process was performed and the molecular weight reduction process was not performed. In addition, the molded products of Comparative Examples 1 and 2, in which the rotation speed of the screw body was set to 500 rpm and 800 rpm, had slightly lower tensile strength and bending strength than Comparative Example 3. From these results, it can be seen that the strength of the molded product of the fiber-reinforced composite material is increased by setting the rotation speed of the screw body to 1000 rpm or more in the molecular weight reduction process.

As shown in Table 1, the viscosity of the fiber-reinforced composite material decreases as the rotation speed of the screw body increases in the molecular weight reduction process. From this result, it can be seen that it is possible to adjust the viscosity of the fiber-reinforced composite material through the rotation speed of the screw body.

According to the results shown in FIG. 12 to FIG. 14, when the rotation speed of the screw body in the molecular weight reduction process is set to 2000 rpm or more, the tensile strength and tensile elastic modulus of the molded product tend to decrease. The molded product of Example 4, in which the rotation speed was set to 3500 rpm, had a slightly lower tensile elastic modulus than Comparative Example 3. Thus, it is preferable to set the rotation speed of the screw body to 3200 rpm or less in the molecular weight reduction process.

According to the above results, it can be said that by setting the rotation speed of the screw body to 1000 rpm or more and 3600 rpm or less in the molecular weight reduction process, it is possible to produce a low-viscosity fiber-reinforced composite material that forms a molded product with excellent tensile strength, bending strength, and elastic modulus.

The shear rate (/second) in the molecular weight reduction process in each of the examples and comparative examples can be calculated as [π×screw diameter of barrel unit× rotation speed]/[60×groove depth of screw]. For example, the shear rate in the molecular weight reduction process in Example 1, in which the rotation speed of the screw body was set to 1000 rpm, is 838 (/second).

As shown in Table 1, the weight-average molecular weight of the fiber-reinforced composite material was 392,000 in Comparative Example 3 before the molecular weight reduction process, 230,000 in Example 1 (1000 rpm) after the molecular weight reduction process, and 143,000 in Example 3 (3000 rpm). When the weight-average molecular weight of the fiber-reinforced composite material of Comparative Example 3 before the molecular weight reduction process was taken as 100%, the fiber-reinforced composite material of Example 1 had a low molecular weight of about 59% of the weight-average molecular weight of Comparative Example 3, and the fiber-reinforced composite material of Example 3 had a low molecular weight of about 36% of the weight-average molecular weight of Comparative Example 3. According to these results, from the viewpoint of producing a fiber-reinforced composite material that forms a molded product with excellent strength and elastic modulus, the molecular weight reduction process is preferably performed so that the weight-average molecular weight after the molecular weight reduction process is 30% or more and 65% or less of the weight-average molecular weight before the molecular weight reduction process.

The following can be said according to the results of the examples and comparative examples.

By performing the molecular weight reduction process using the high shear processing unit after the fiber dispersion process of dispersing the fibers in the resin using the twin-screw kneading extrusion unit in the continuous high shear processing device, a low-viscosity fiber-reinforced composite material with high fluidity was obtained.

The viscosity of the fiber-reinforced composite material was able to be controlled by adjusting the processing conditions such as the rotation speed in the molecular weight reduction process performed by the high shear processing unit.

The fiber-reinforced composite material produced by the fiber dispersion process and the molecular weight reduction process achieved low viscosity and high fluidity suitable for injection molding, while maintaining high mechanical properties of the injection molded product.

INDUSTRIAL APPLICABILITY

According to the production method of the present invention, it is possible to provide a fiber-reinforced composite material with high fluidity that is suitable for injection molding. In addition, because the fiber-reinforced composite material is able to be molded into a molded product having excellent mechanical properties by injection molding, the fiber-reinforced composite material is suitable as a material for forming a thin molded product having a thickness of 0.5 mm or less, for example.

What is claimed is:

1. A method for producing a fiber-reinforced composite material, comprising:
   a fiber dispersion process of forming a fiber-dispersed resin by kneading a resin with fibers to disperse the fibers in the resin, wherein a weight ratio of the fibers and the resin (fiber/resin) in the fiber dispersion process is 2/8 or more and 5/5 or less; and
   a molecular weight reduction process of reducing a molecular weight of the fiber-dispersed resin to produce the fiber-reinforced composite material,
   wherein the molecular weight reduction process, while transporting the fiber-dispersed resin along an outer peripheral surface of a screw body that includes a passage inside, restricts transport of the fiber-dispersed resin with a barrier unit provided between an inlet and an outlet of the passage on the outer peripheral surface to form a resin reservoir, in which a filling rate of the fiber-dispersed resin is 100%, immediately before the barrier unit, apply a shear force to the fiber-dispersed resin with a rotation speed of the screw body set to 1500 rpm or more and 3200 rpm or less, and cause the fiber-dispersed resin to pass from the inlet of the passage to the outlet of the passage.

2. The method for producing the fiber-reinforced composite material according to claim 1, wherein the molecular weight reduction process reduces the molecular weight of the fiber-dispersed resin to 30% or more and 65% or less of a weight-average molecular weight before the molecular weight reduction process.

3. The method for producing the fiber-reinforced composite material according to claim 2, wherein the fibers are glass fibers.

4. The method for producing the fiber-reinforced composite material according to claim 1, wherein the resin is one or more selected from a group consisting of polypropylene, polysulfone, polyethylene terephthalate, polybutylene terephthalate, polyether sulfone, and polyphenylene sulfide.

5. The method for producing the fiber-reinforced composite material according to claim 1, wherein the molecular weight reduction process reduces a weight-average molecular weight of the fiber-dispersed resin to form a fiber-reinforced composite material having a spiral length of 100 cm or more, which is measured using a spiral mold having a semicircular flow path cross section with a radius of 2.38 mm, under conditions of a molding temperature of 235° C., a primary injection pressure of 99 MPa, and a mold cooling temperature of 50° C.

6. The method for producing the fiber-reinforced composite material according to claim 1, wherein the fiber-reinforced composite material is a fiber-reinforced composite material for injection molding.

7. The method for producing the fiber-reinforced composite material according to claim 1, wherein a tensile strength of a molded product of the fiber-reinforced composite material is 53.3 MPa or more.

* * * * *